United States Patent [19]

Clifford

[11] Patent Number: 4,876,819
[45] Date of Patent: Oct. 31, 1989

[54] FISHING REEL PROTECTOR

[76] Inventor: James R. Clifford, 12013-22nd St., Santa Fe, Tex. 77510

[21] Appl. No.: 329,350

[22] Filed: Mar. 27, 1989

[51] Int. Cl.$^4$ .............................................. A01K 97/08
[52] U.S. Cl. ...................................................... 43/26
[58] Field of Search ............................. 43/18.1, 25, 26

[56] References Cited

U.S. PATENT DOCUMENTS

| | | | |
|---|---|---|---|
| 2,618,880 | 1/1947 | Sourek | 43/26 |
| 2,869,277 | 5/1957 | Breithaupt | 43/26 |
| 3,762,592 | 10/1973 | Mayes | 43/26 |
| 4,136,478 | 1/1979 | Wycosky | 43/26 |
| 4,493,416 | 1/1985 | Steinman | 43/26 |
| 4,641,454 | 2/1987 | Ray et al. | 43/26 |
| 4,726,141 | 2/1988 | McBride et al. | 43/26 |

*Primary Examiner*—Nicholas P. Godici
*Assistant Examiner*—Michael W. Starkweather
*Attorney, Agent, or Firm*—McClung, Guy

[57] ABSTRACT

The present invention is directed to a fishing reel protector. In one embodiment a reel protector according to the present invention has a plurality of pockets and a flexible and/or extensible connecting member extending between the pockets. The reel protector is made from a flexible material such as cloth, flexible woven or non-woven material, or flexible synthetic material. In one embodiment the pockets of a reel protector according to the invention are disposed about a common mouth which may have an elastic band encircling it to facilitate the securement of the reel protector on a reel. Pockets can be provided to encompass two or more reel parts such as the front of a reel, a reel handle, or the rear of a reel. Since the pockets are made of flexible material, a single reel protector can accommodate a variety of different reels. In one embodiment of a reel protector according to this invention a flexible and/or extensible connecting member between pockets can be fashioned to accommodate a reel mount or an object other than part of the reel such as a rod to which the reel is mounted.

4 Claims, 2 Drawing Sheets

FISHING REEL PROTECTOR

BACKGROUND OF THE INVENTION

1. Field of the Invention

This invention is directed to protectors for fishing reels and particularly to protectors made from flexible material which can be wrapped around all or part of a reel.

2. Description of the Prior Art

Many fishing reels have numerous intricate parts and numerous moving parts. These reels are often exposed to the elements when they are not actually in use. Also the moving parts, e.g., a reel handle or a reel bail, can be accidentally moved or manipulated when the reel is not in use or the parts can catch on some other object. Hard case reel protectors are relatively expensive and relatively difficult to manufacture. They are also cumbersome for a fisherman or fisherwoman to carry around. Boxes such as those in which reels are initially sold cannot be used on a reel while the reel is mounted on a fishing rod. Also hard case protectors are generally not suited to protect a variety of reels which differ in size, type, and configuration.

There have long been unsatisfied needs for a simple, flexible, easily assembled, easily used fishing reel protector and for a reel protector which can accommodate a variety of different reels.

SUMMARY OF THE PRESENT INVENTION

The present invention is directed to a fishing reel protector. In one embodiment a reel protector according to the present invention has a plurality of pockets and a flexible and/or extensible connecting member extending between the pockets. The reel protector is made from a flexible material such as cloth, flexible woven or non-woven material, or flexible synthetic material. In one embodiment the pockets of a reel protector according to the invention are disposed about a common mouth which may have an elastic band encircling it to facilitate the securement of the reel protector on a reel. Pockets can be provided to encompass two or more reel parts such as the front of a reel, a reel handle, or the rear of a reel. Since the pockets are made of flexible material, a single reel protector can accommodate a variety of different reels. In one embodiment of a reel protector according to this invention a flexible and/or extensible connecting member between pockets can be fashioned to accommodate a reel mount or an object other than part of the reel such as a rod to which the reel is mounted.

It is, therefore, an object of the present invention to provide an efficient, novel, simple, and nonobvious fishing reel protector.

It is also an object of this invention to solve the various problems associated with the use, protection, and transport of fishing reels.

Yet another object of this invention is the provision of a fishing reel protector which can protect reels of varying shapes, types, and sizes.

A further object of this invention is the provision of a fishing reel protector which is easily disposed on a reel.

Another object of this invention is the provision of a reel protector made from flexible material and having a plurality of pockets to accommodate part or all of a reel.

A further object of this invention is the provision of a reel protector with an elastic band around a mouth which makes it easier to keep the reel protector in place.

An additional object of this invention is the provision of a reel protector which has a connecting member between pockets which can accommodate reel parts or parts of an object other than those of a reel.

A further object of this invention is the provision of a reel protector which satisfies the long-felt needs described above.

The present invention recognizes and addresses the previously-mentioned long-felt needs and provides a satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings and photographs. Although these descriptions are detailed to insure adequacy and aid understanding, this is not intended to prejudice that purpose of a patent which is to claim an invention no matter how others may later dispute it by variations in form or additions or further improvements. The claims at the end of this specification are intended as the chief aid toward this purpose.

DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only preferred embodiments on the invention and are therefore not to be considered limiting of its scope, for the invention may admit to other equally effective embodiments.

DESCRIPTION OF PRESENTLY PREFERRED EMBODIMENTS

Figure 1:
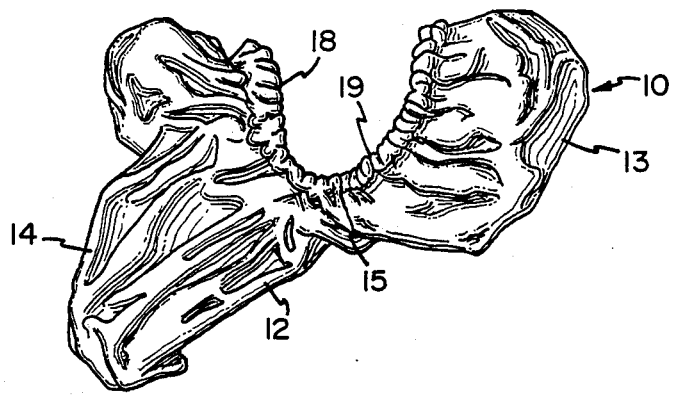
FIG. 1 is a side view of a reel protector according to this invention.
Figure 2:
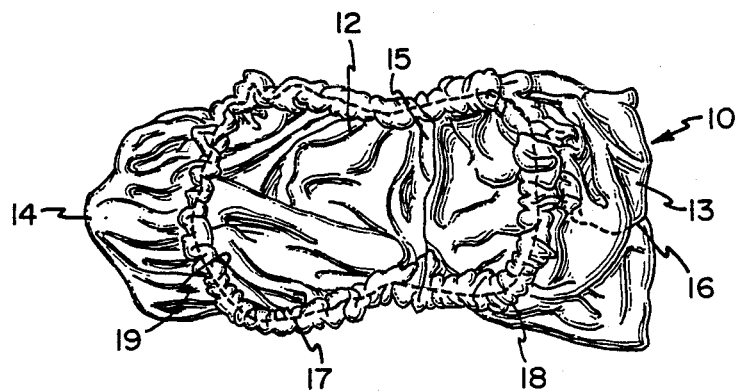
FIG. 2 is a bottom view of the protector of FIG. 1.
Figure 3:
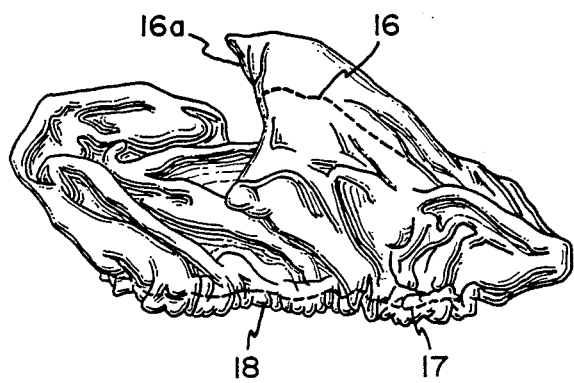
FIG. 3 is a top perspective view of the protector of FIG. 1.

As shown in FIGS. 1-3 a reel protector 10 according to this invention has a body 12 which has a pocket 13, a pocket 14, a connecting member 15, and two seams 16 and 16a. It is preferred that the two seams be perpendicular to each other. The body 12 can be made from any suitable flexible material. An elastic band 17 (shown in dashed lines in FIG. 2) held within a fold 18 in a mouth 19 of the body 12. Each pocket opens as part of the mouth 19. The pockets can be configured and disposed as desired to fit a particular reel; but one protector with a plurality of pockets can accommodate a variety of reels.

Figure 4A:
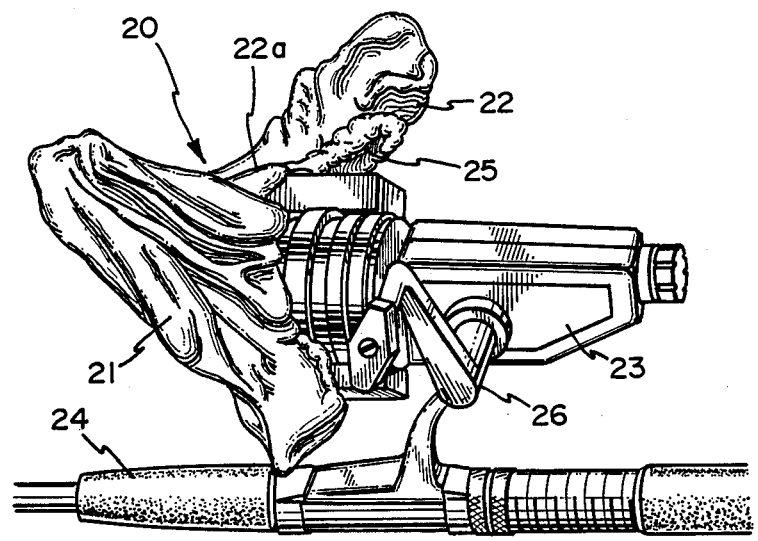
FIG. 4A is a perspective view showing emplacement of a protector according to this invention on a reel.
Figure 4B:
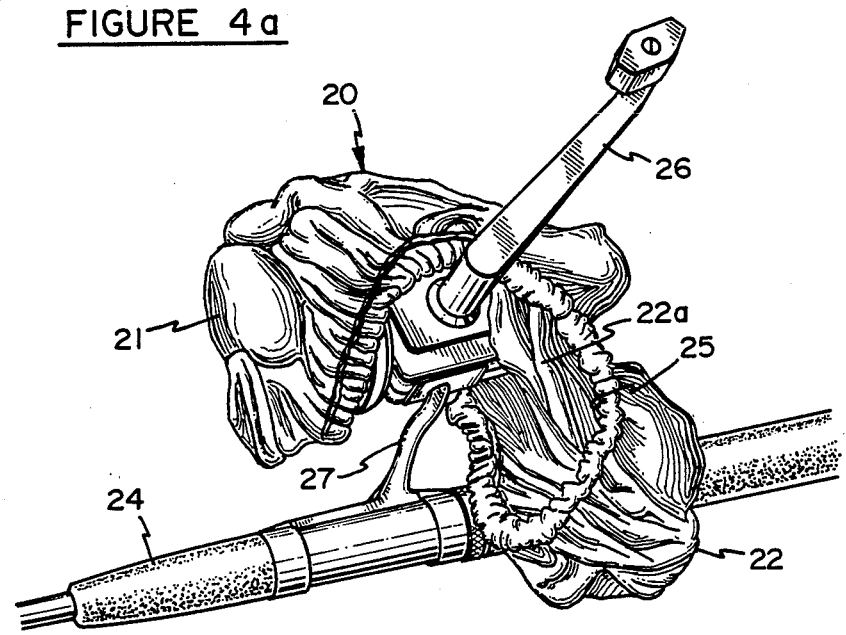
FIG. 4B is a side perspective view of the protector of FIG. 4A.
Figure 5:
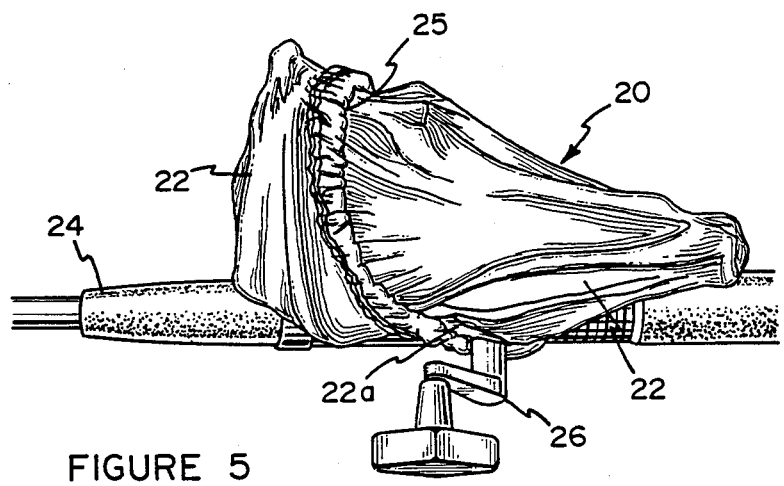
FIG. 5 is a perspective view of the protector of FIG. 4A on the reel of FIG. 4A.
Figure 6:
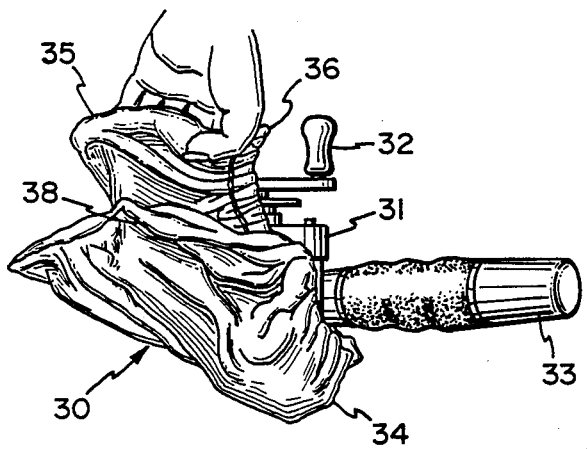
FIG. 6 is a perspective view showing emplacement of a protector according to this invention on a reel.
Figure 7:
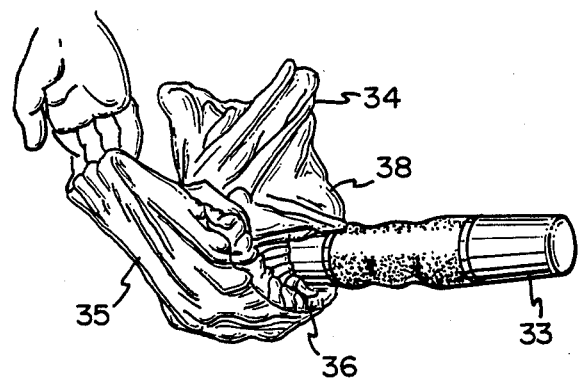
FIG. 7 is a perspective view of the protector of FIG. 6 on the reel of FIG. 6.
Figure 8:
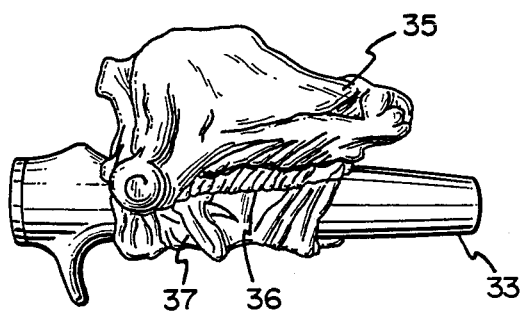
FIG. 8 is a right side view of the protector of FIG. 6 on the reel of FIG. 6.
Figure 9:
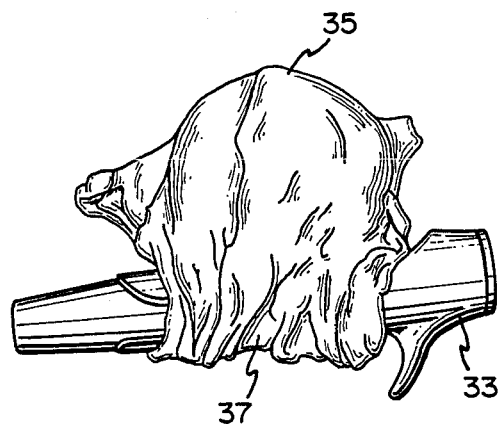
FIG. 9 is the left side view of the protector of FIG. 8.
Figure 10:
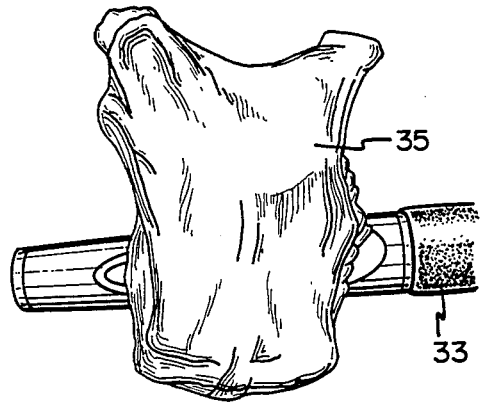
FIG. 10 is a top view of the protector of FIG. 8.
Figure 11:
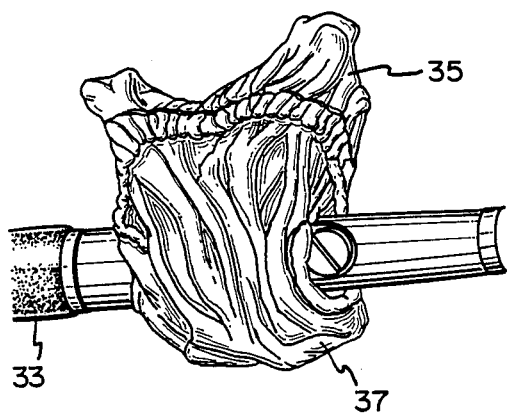
FIG. 11 is a bottom view of the protector of FIG. 8.

A reel protector 20 according to this invention is shown in FIGS. 4A, 4B, and 5. The protector 20 has a pocket 21, a pocket 22, and an interconnecting portion 22a. As shown in FIG. 4A the pocket 21 has been emplaced on and around the bail and spool of a typical open-face reel 23 which is mounted on a rod 24 while the pocket 22 and interconnecting portion 22a are still free. As shown in FIG. 4B, the pocket 21 has been stretched down the back side and around the bottom of the reel 23. The interconnecting portion 22a is now in position to wrap around the reel handle shaft 26 and the reel mounting post 27. The pocket 22 is opened and stretched over the bail and spool portion of reel 23 that is already covered with the pocket 21. Covering the pocket 21 with the pocket 22 allows the interconnecting portion 22a to encircle the reel handle shaft 26 and the reel mounting post 27. In FIG. 4B the interconnecting portion 22a also covers the top and side portion of the reel 23 between the reel shaft 26 and the mounting post 27. As shown in FIG. 5 the pocket 22 has been pulled over and around a rear portion of the reel 23. A mouth 25 of the protector 20, as shown in FIG. 5 has been pulled over an edge of the pocket 22. The protector 20 is configured so that it need not encompass a handle 26 of the reel 23.

As shown in FIGS. 6–11, a protector 30 can be configured and disposed to protect a typical bait casting reel 31 with a handle 32, the reel mounted on a rod 33. The protector 30 has a body 38 with a pocket 34 and a pocket 35 with a common mouth 36. The pockets have a connecting member 37 between them. The pocket 34 is emplaced on one side portion of the reel and then the protector 30 is stretched around and past the side of the reel with the handle 32 and part of the pocket 35 is then placed over the handle 32 to hold the protector on the reel. The reel protector 30 encompasses all of the reel 31 including its handle. The reel protector 32 also extends around the rod 33 so that the protector 30 is usable on a reel which is mounted to a rod. Of course a protector according to this invention (such as the protectors 20 or 30) can be used to protect a reel which is not mounted to anything.

While there have been described various embodiments of the present invention, the apparatuses described are not intended to be understood as limiting the scope of the invention. It is realized that changes therein are possible and it is further intended that each element recited in any of the following claims is to be understood as referring to all equivalent elements for accomplishing substantially the same results in substantially the same or an equivalent manner.

What is claimed is:

1. A fishing reel protector comprising a body member made from flexible material,
   a plurality of interconnected protective pockets formed of the body member made from flexible material,
   each of the plurality of pockets fashioned to accommodate a portion of a reel to be protected
   wherein the body member has a mouth, each pocket entirely or partially extending from the mouth, and
   an elastic band attached to and around the mouth to keep the reel protector in place on the reel.

2. The reel protector of claim 1 including
   a connecting member between two of the pockets,
   the connecting member made from flexible material.

3. The reel protector of claim 1 wherein the body member is large enough and so fashioned and there is a sufficient number of pockets which are so fashioned that substantially all of the reel can be encompassed by and protected by the reel protector.

4. A fishing reel protector comprising a body member made from flexible material,
   a plurality of interconnected protective pockets formed of the body member made from flexible material,
   each of the plurality of pockets fashioned to accommodate a portion of a reel to be protected,
   the body member having a mouth, each pocket entirely or partially extending from the mouth,
   an elastic band attached to and around the mouth to keep the reel protector in place on the reel,
   a connecting member between two of the pockets,
   the connecting member made from flexible material, and
   the body member large enough and so fashioned and a sufficient number of pockets which are so fashioned that substantially all of the reel can be encompassed by and protected by the reel protector.

* * * * *